United States Patent
Bauer

(10) Patent No.: US 6,729,345 B2
(45) Date of Patent: May 4, 2004

(54) SEALING VALVE ARRANGEMENT

(75) Inventor: Jürgen Bauer, Tübingen (DE)

(73) Assignee: Busak + Shamban GmbH, Stuttgart (DE)

( * ) Notice: Subject to any disclaimer, the term of this patent is extended or adjusted under 35 U.S.C. 154(b) by 7 days.

(21) Appl. No.: 10/043,973

(22) Filed: Jan. 11, 2002

(65) Prior Publication Data
US 2002/0096214 A1 Jul. 25, 2002

(30) Foreign Application Priority Data
Jan. 25, 2001 (DE) .......................... 101 03 275

(51) Int. Cl.⁷ ............................... F16K 17/19
(52) U.S. Cl. ................. 137/493.8; 137/493.9; 137/512.4
(58) Field of Search ............... 137/493, 493.8, 137/493.9, 512.4

(56) References Cited

U.S. PATENT DOCUMENTS

| | | |
|---|---|---|
| 2,133,575 A | 5/1938 | Rosenberg |
| 3,430,648 A | 3/1969 | Botkin |
| 4,711,435 A | 12/1987 | Harris et al. |
| 4,922,954 A | 5/1990 | Blomquist et al. |
| 4,944,425 A | 7/1990 | Kasugai et al. |
| 5,455,124 A | 10/1995 | Schollenberger |
| 5,499,654 A * | 3/1996 | Shefte .................... 137/493.9 |

FOREIGN PATENT DOCUMENTS

| | | |
|---|---|---|
| DE | 4135711 | 12/1992 |
| DE | 4300441 | 12/1993 |
| DE | 4315701 | 11/1994 |
| DE | 19746106 | 4/1999 |
| GB | 721939 | 1/1955 |
| GB | 2377742 | 1/2003 |

* cited by examiner

Primary Examiner—Stephen M. Hepperle
(74) Attorney, Agent, or Firm—Polster, Lieder, Woodruff & Lucchesi L.C.

(57) ABSTRACT

A sealing valve arrangement (12) for a container containing a fluid, wherein a supporting element (14) comprising a control channel (15) in the border region of the supporting element (14) and a securing element (16) comprising a passage channel (18) are disposed on top of one another over the fluid storage (13') of the container. A sealing valve (1) having smaller radial dimensions than these elements (14, 16) and a valve channel (2) for connecting the control channel (15) and the passage channel (18) are provided between the supporting element (14) and the securing element (17), wherein the sealing valve (1) comprises a first sealing surface or edge (5) for sealing the passage channel (18) from the control channel (15) and a second sealing surface or edge (8) for sealing the valve channel (2) from the control channel (15). The sealing valve (1) operates in case of pressure above atmospheric and sub-atmospheric pressure within the fluid storage (13').

5 Claims, 2 Drawing Sheets

SEALING VALVE ARRANGEMENT

This application claims Paris Convention priority of DE 101 03 275.7-12 filed Jan. 25, 2001 the complete disclosure of which is hereby incorporated by reference.

BACKGROUND OF THE INVENTION

The invention relates to an arrangement comprising a sealing valve for pressure compensation within a container containing a fluid.

DE 41 35 711 C2 e.g. discloses a sealing valve arrangement comprising a sealing valve.

Sealing valves are required for the cells of storage batteries, wherein the sealing valve reliably prevents leakage of battery acid and gas under normal pressure conditions and opens at a defined pressure above atmospheric within the battery cell and discharges gas. Storage batteries of this type, in particular lead accumulators for automotive vehicles, are mass produced articles wherein the sealing valves must be produced at as little costs as possible.

The control channel of the conventional sealing valve provides a defined flow path for fluids which terminates at a sealing bead which permits defined application of pressure of this predetermined gas discharge location and produces improved, more controlled and finer response characteristics.

The tank lids of motor saws e.g. require valve operation for pressure above atmospheric and sub-atmospheric pressure to compensate the pressure within the container.

It is the underlying purpose of the invention to improve a conventional sealing valve such that the sealing valve assumes valve operation for pressure above atmospheric and sub-atmospheric pressure within the container.

SUMMARY OF THE INVENTION

This object is achieved in accordance with the invention by a sealing valve arrangement for a container containing a fluid. A supporting element comprising a control channel in its border region and a securing element comprising a passage channel are disposed on top of one another above the fluid containing chamber of the container. A sealing valve having smaller radial dimensions than these elements and a valve channel for connecting the control channel and the passage channel are also provided between the supporting element and the securing element. The sealing valve comprises a first sealing surface or edge for sealing the passage channel from the control channel, and a second sealing surface or edge for sealing the valve channel from the control channel. The sealing arrangement guarantees pressure compensation within the container in two directions, i.e. in case of pressure above atmospheric and sub-atmospheric pressure. An subatmospheric pressure of 100 mbar and an pressure above atmospheric of 300 mbar can be compensated by e.g. the sealing edges, appropriate selection of the material and the pretension. Pressure variations within predetermined limits can be reliably reduced. The sealing arrangement can be used as tank aerating and deaerating valve etc. It operates at different opening pressures depending on the direction. The container is sealed up to a certain pressure level. In case of sub-atmospheric pressure in the container, the sealing arrangement opens at a smaller pressure compared to pressure above atmospheric. The sealing action is achieved by axial pretension. The cross-section of the valve channel and the strength of the first sealing edge define the value of the opening pressure. In case of pressure above atmospheric in the container, the second sealing edge at the supporting element opens and reduces the pressure.

In a preferred embodiment of the invention, the sealing element is formed by a valve cone having inclined surfaces on which the second sealing edge abuts. The valve channel can be disposed onto the cone tip to achieve an arrangement which is easy to assemble and additionally has good response characteristics under pressure above atmospheric.

The valve function can be enhanced by providing one control channel on each side of the central axis of the supporting element.

Another subject matter of the invention is a sealing valve of a rubber-elastic material for container openings having a valve channel and, at its upper side, a first circumferential sealing edge formed on both sides of the valve channel, and at its lower side a second sealing edge formed around the valve channel. Recesses are provided in the material below the first sealing edge via which the response characteristics of the sealing valve can be controlled in case of sub-atmospheric pressure.

DRAWING

The schematic drawing shows an embodiment of the inventive sealing valve and an inventive sealing valve arrangement which are explained in the following description.

DESCRIPTION OF THE PREFERRED EMBODIMENT

Figure 1:
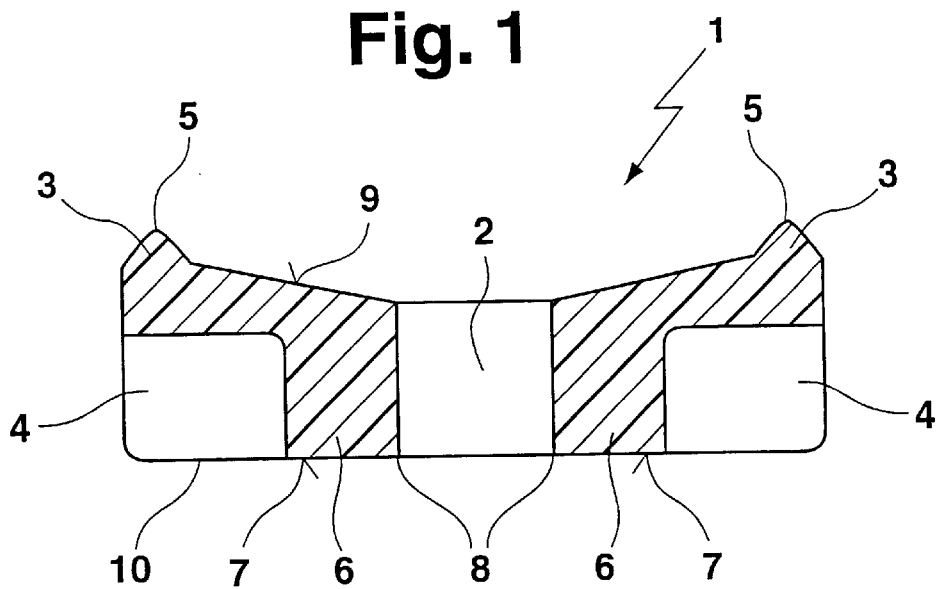
FIG. 1 shows a cross-sectional view of a sealing valve.

FIG. 1 shows a sealing valve 1 comprising a central valve channel 2 and recesses 4 in the material on both sides below a circumferential bead 3 for forming predetermined gas discharge locations, wherein the sealing valve 1 is symmetrical to its central axis, i.e. to the valve channel 2. The ring-shaped bead 3 terminates into a first sealing edge 5. A border region 6 delimits the valve channel 2 and terminates in a sealing surface 7 and a second sealing edge 8. The sealing valve 1 can seal from fluid pressure which acts on its upper side 9 and also on its lower side 10. The first and second sealing edge 5 and 8 and the sealing surface 7, respectively, can assume the valve function of a sealing valve arrangement as shown e.g. in FIG. 3. The curved upper side 9 of the second sealing edge 8 cooperates with the curved upper side 9 within the first sealing edge 5 in case of pressure above atmospheric in the fluid storage 13' in the container such that the sealing edge 8 yields at least at one location and a gap opens at the inclined surfaces of a valve cone (FIG. 3) (predetermined discharge of gas in case of pressure above atmospheric).

Figure 2:
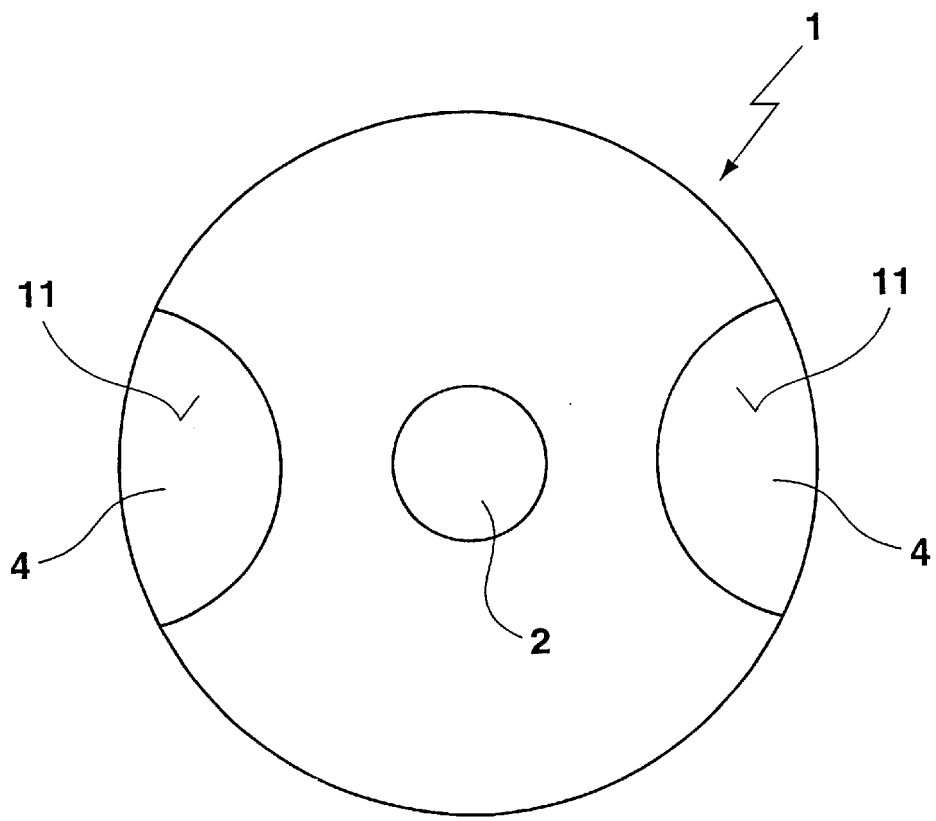
FIG. 2 shows a top view onto the lower side of the sealing valve in accordance with FIG. 1.

The top view of FIG. 2 shows that the recesses 4 in the material have a limited recessed control surface 11 below the bead or the first sealing edge. A fluid can flow into the recesses 4 of the material and the bead or the first sealing edge presses at one point against the abutment surface. When the fluid pressure is reduced, the material of the sealing valve 1 weakens in this region due to the recesses in the material which permits valve operation since the first sealing edge in the region opposite to the control surface 11 can yield. The control surfaces 11 define regions of a predetermined gas discharge in case of fluid sub-atmospheric pressure in the container.

Figure 3:
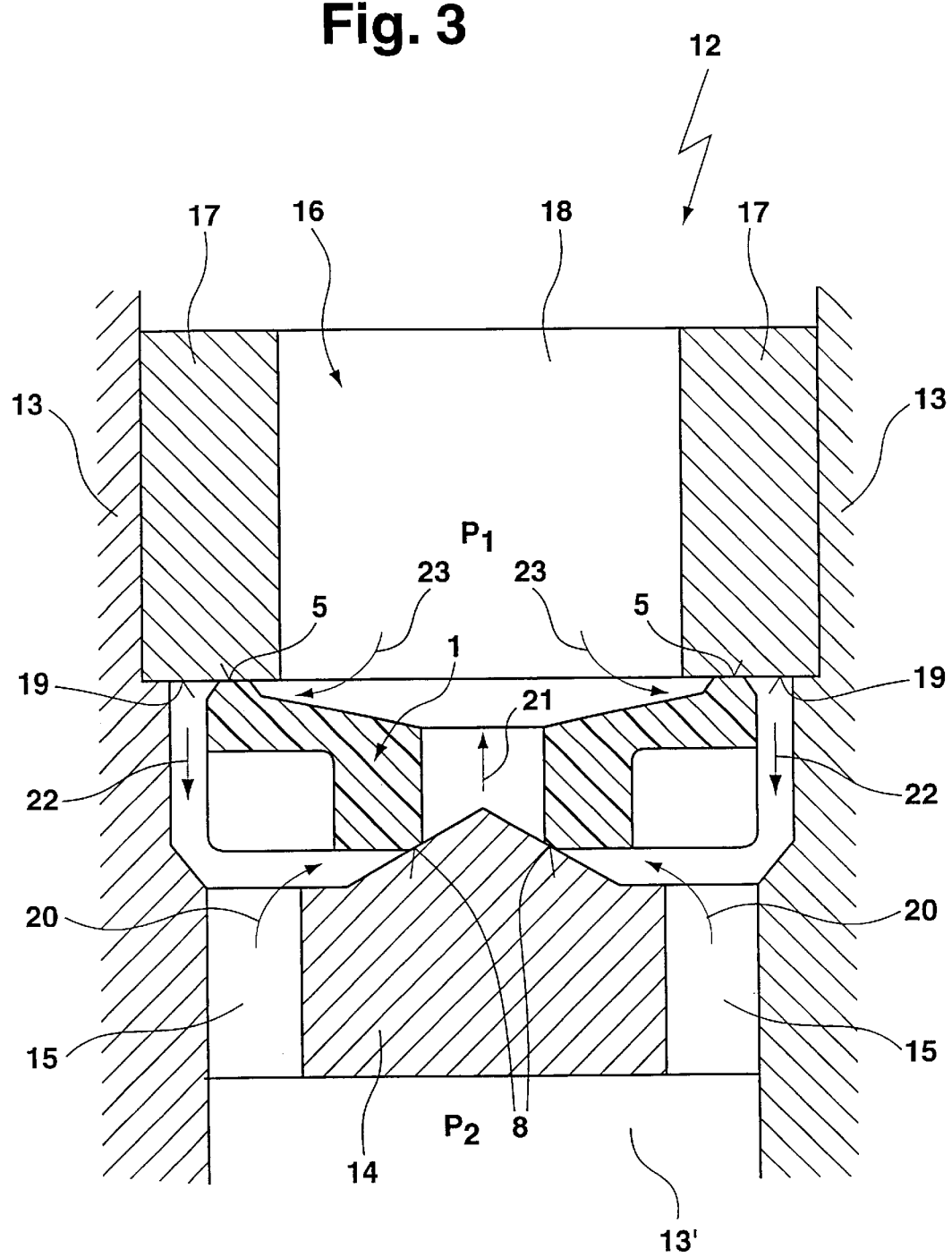
FIG. 3 shows a cross-sectional view of a sealing arrangement with installed sealing valve according to FIGS. 1 and 2.

FIG. 3 shows the basic design and principal function of a sealing arrangement 12. Variations of the details of the invention are, of course, feasible. A housing wall 13 receives the sealing valve 1 via a valve cone 14 through which a supporting element is formed and which can be part of the housing or is formed by a separate structural component which is disposed such that it can be exchanged via the fluid storage 13'. Both sides of the valve cone 14 are provided with control channels 15 via which the fluid can penetrate to the circumferential second sealing edge 8 and the control surfaces 11. The sealing edge 8 is elastically pretensioned at the inclined surfaces of the valve cone 14 since the sealing valve 1 is produced from a rubber-elastic material. In principle, all rubber-elastic materials are suitable for the production of the inventive sealing valve 1. Preferably e.g. fluoroelastomers FPM, FKM and silicon caoutchouc are used. A securing element 16 is located above the sealing valve 1 which stationarily positions and pretensions the installed sealing valve 1 and has a passage channel 18 delimited by the edges 17. The securing element 16 can also be an integrated component of the housing and be rigidly connected to the housing wall 13. The first sealing edge 5 of the installed sealing valve 1 elastically abuts the abutment surfaces 19 of the securing element 16. The elastic abutment is enhanced by the recesses 4 in the material. The sealing valve 1 can have double action, i.e. it can react to pressure variations in both directions. The arrows 20 to 23 indicate the different flow variations of the fluid. It depends whether a fluid pressure $P_1$, is larger than a fluid pressure $P_2$ or vice versa. If $P_1$, is larger than $P_2$, i.e. sub-atmospheric pressure prevails in the fluid storage 13', the first sealing edge 5 can be released at least at one location from the abutment surface 19 and open the path for the fluid in the direction of arrows 23 and 22. If the sub-atmospheric pressure is compensated, the first sealing edge 5 returns to its original sealing position. If $P_2$ is larger than $P_1$, the second sealing edge 8 is lifted from the conical surfaces and opens the path in the direction of arrows 20 and 21 via a resulting gap at the inclined surfaces of the valve cone. After pressure compensation, the second sealing edge 8 returns into its original position and seals again the fluid storage 13'.

Possible parameters for defined response characteristics of the sealing valve 1 are: The dimensions of the shoulders 3 which abut the abutment surface, the rigidity of the material, the cross-sectional surface of the recesses 4 and of the valve channel 2 and the design of the valve cone 14.

List of Reference Numerals
1 sealing valve
2 valve channel
3 bead
4 recess
5 first sealing edge
6 border region
7 sealing surface
8 second sealing edge
9 upper side
10 lower side
11 control surface of the recess
12 sealing valve arrangement
13 housing wall
14 valve cone
15 control channel
16 securing element
17 edge
18 passage channel
19 abutment surface
20 flow direction
21 flow direction
22 flow direction
23 flow direction

I claim:

1. A sealing valve arrangement (12) for a container containing a fluid, the sealing valve arrangement comprising:

a supporting element (14) comprising a control channel (15) in the border region of the supporting element (14);

a securing element (16) comprising a passage channel (18), the supporting element and securing element being disposed on top of one another over a fluid storage (13') of the container, and a flexible sealing valve (1) between the supporting element (14) and the securing element (16), the sealing valve having a smaller radial dimension than the supporting element (14) and the securing element (16) and comprising a valve channel (2) for connecting the control channel (15) and the passage channel (18), a first sealing surface or edge (5) for sealing the passage channel (18) from the control channel (15), a second sealing surface or edge (8) for sealing the valve channel (2) from the control channel (15), and recesses at a periphery of the sealing valve below the first sealing edge (5); said recesses defining an area of weakness in said sealing valve to allow said sealing valve to flex, whereby when a pressure above said valve is greater than a pressure below said valve, said valve will flex to form a gap adjacent said first sealing surface, and when a pressure below said valve is greater than a pressure above said valve said valve will flex to form a gap adjacent said second sealing surface.

2. The sealing valve arrangement according to claim 1, characterized in that one control channel (15) is disposed on each side of the central axis of the supporting element (14).

3. A sealing valve arrangement (12) for a container containing a fluid, the sealing valve arrangement comprising:

a supporting element (14) comprising a control channel (15) in the border region of the supporting element (14); there being one control channel (15) disposed on each side of the central axis of the supporting element (14), a securing element (16) comprising a passage channel (18), the supporting element and securing element being disposed on top of one another over a fluid storage (13') of the container, and a sealing valve (1) between the supporting element (14) and the securing element (16), the sealing valve having a smaller radial dimension than the supporting element (14) and the securing element (16) and comprising a valve channel (2) for connecting the control channel (15) and the passage channel (18), a first sealing surface or edge (5) for sealing the passage channel (18) from the control channel (15), a second sealing surface or edge (8) for sealing the valve channel (2) from the control channel (15), and recesses in the sealing valve below the first sealing edge (5).

4. The sealing valve arrangement according to claim 3, characterized in that the supporting element is formed by a valve cone (14) having inclined surfaces on which the second sealing edge (8) abuts.

5. A flexible sealing valve (1) of rubber-elastic material for container openings, comprising an upper side, a lower side, a valve channel (2), a circumferential first sealing edge (5) formed on each of the two sides of the valve channel (2) on the upper side of the sealing valve, a second sealing edge (8) formed around the valve channel (2) on the lower side of the sealing valve, and recesses in the material below the first sealing edges (5), said recesses having an upper surface and a wall whereby said recess is open only at the periphery of said seal, said recess upper surface forming a control surface; said recess enabling said valve seal to flex in response to increased pressure at the upper surface of said valve and at the control surface.

* * * * *